United States Patent
Green

(10) Patent No.: US 9,863,455 B2
(45) Date of Patent: Jan. 9, 2018

(54) PIN JOINT ASSEMBLY

(71) Applicant: Safran Landing Systems UK Ltd, Gloucester, Gloucestershire (GB)

(72) Inventor: Chris Green, Churchdown (GB)

(73) Assignee: Safran Landing Systems UK LTD (GB)

( * ) Notice: Subject to any disclaimer, the term of this patent is extended or adjusted under 35 U.S.C. 154(b) by 111 days.

(21) Appl. No.: 14/761,142

(22) PCT Filed: Jan. 13, 2014

(86) PCT No.: PCT/GB2014/050009
§ 371 (c)(1),
(2) Date: Jul. 15, 2015

(87) PCT Pub. No.: WO2014/111685
PCT Pub. Date: Jul. 24, 2014

(65) Prior Publication Data
US 2015/0354614 A1    Dec. 10, 2015

(30) Foreign Application Priority Data
Jan. 18, 2013    (GB) .................................. 1300916.2

(51) Int. Cl.
*F16C 11/04*    (2006.01)
*F16B 19/00*    (2006.01)
(Continued)

(52) U.S. Cl.
CPC ............ *F16B 19/002* (2013.01); *F16C 11/02* (2013.01); *F16C 11/045* (2013.01); *F16C 25/04* (2013.01); *Y10T 24/4698* (2015.01)

(58) Field of Classification Search
CPC ......... F16C 11/02; F16C 11/04; F16C 11/045; E02F 9/006; B64C 25/02; B64C 25/04;
(Continued)

(56) References Cited

U.S. PATENT DOCUMENTS 3,130,991 A * 4/1964 Piragino ............... F16C 11/045
                                                       384/125
3,467,422 A * 9/1969 Mielke ................. F16C 11/045
                                                       403/11
(Continued)

FOREIGN PATENT DOCUMENTS

EP    1050456 A1 * 11/2000    ............ B64C 25/04
EP    2071198        6/2009
(Continued)

OTHER PUBLICATIONS

Great Britain Combined Search and Examination Report for Application No. GB1300916.2 dated May 17, 2013.
(Continued)

*Primary Examiner* — Jonathan Masinick
(74) *Attorney, Agent, or Firm* — RatnerPrestia

(57) ABSTRACT

A pin joint assembly for an aircraft landing gear having an elongate joint pin; at least one first lug through which the joint pin passes; and at least one second lug through which the joint pin passes. The joint pin assembly includes first and second retaining elements located at opposite ends of the joint pin and arranged to maintain the location of the joint pin relative to the first and second lugs. At least portion of the pin joint assembly is elastically deformable.

12 Claims, 3 Drawing Sheets

(51) Int. Cl.
*F16C 11/02* (2006.01)
*F16C 25/04* (2006.01)

(58) Field of Classification Search
CPC ..... Y10T 403/32861; Y10T 403/32893; Y10T 403/32909; F16B 19/002; F16B 19/004; F16B 19/006
See application file for complete search history.

(56) References Cited

U.S. PATENT DOCUMENTS

| | | | | |
|---|---|---|---|---|
| 3,710,674 | A | | 1/1973 | Tabor |
| 4,087,928 | A | * | 5/1978 | Mickus .................. E02F 9/2841 299/109 |
| 4,717,191 | A | * | 1/1988 | Farmer .................. B66C 3/005 294/119.4 |
| 4,809,960 | A | * | 3/1989 | Kakimoto ............... B60G 7/00 248/634 |
| 5,201,898 | A | * | 4/1993 | Pierce ................... B60G 7/02 280/124.116 |
| 5,730,430 | A | * | 3/1998 | Hodson .................. F16F 3/02 267/162 |
| 6,071,033 | A | | 6/2000 | Neitzel |
| 6,322,280 | B1 | * | 11/2001 | Coyne .................... E02F 9/006 403/154 |
| H002012 | H | * | 2/2002 | Roth ....................... B66C 3/005 403/57 |

FOREIGN PATENT DOCUMENTS

| | | |
|---|---|---|
| FR | 745143 | 5/1933 |
| FR | 2118756 | 7/1972 |
| FR | 2764953 | 12/1998 |
| GB | 1332323 | 10/1973 |
| TW | 257976 | 7/2006 |

OTHER PUBLICATIONS

International Search Report and Written Opinion for International Application No. PCT/GB2014/050009 dated Apr. 10, 2014.

\* cited by examiner

PIN JOINT ASSEMBLY

This application is a U.S. National Phase application of PCT International Application No. PCT/GB2014/050009, filed Jan. 3, 2014, which claims the benefit of GB 1300916.2. filed Jan. 18, 2013, both of which are incorporated herein by reference.

FIELD OF THE INVENTION

This invention relates to a pin joint assembly and in particular a pin joint assembly for an aircraft landing gear.

BACKGROUND TO THE INVENTION

For aircraft with retractable landing gear, each landing gear assembly typically includes a number of pin joint assemblies that allow separate elements of the landing gear assembly to pivot about the pin joint. Pin joints will typically be included in the side-stay assemblies to allow the upper and lower elements of the side-stay to pivot both with respect to one another and with respect to the main sliding tube of the landing gear and the aircraft frame itself.

As the landing gear assembly can experience both lateral and longitudinal loadings during take-off and landing events it is normal for some deflection to occur in the lugs of the side-stays through which the pin joint passes. Such deflections are exacerbated in modern side-stay designs, which exhibit complex geometry to accommodate other landing gear elements, such as springs and hydraulics, in order to reduce air resistance and the risk of bird strike when the gear is deployed. At present, the forces induced as a result of these lug deflections are reacted by the headed pin and nut or end cap of the pin joint assembly that passes through the lugs and allows the relative rotation of the two side-stay elements. Consequently, the headed pin and nut or end cap must be designed to be capable of carrying these deflection loads, with the necessary safety margin provided. To achieve this increased load carrying capability, the mass of the pin joint assembly is increased considerably. For example, for a mid sized commercial aircraft, this weight difference is typically around 2.5 kg per pin joint. On dual stay landing gear assembly for such an aircraft with six pin joints, approximately 15 kg may be added to the mass of each landing gear assembly simply to provide the requisite additional load carrying capability of the pin joint assemblies. In addition to the increased manufacturing cost arising from the larger pin joint assemblies, this added weight is undesirable in terms of the overall weight of the aircraft as it has a direct bearing on the fuel efficiency of the aircraft. It would therefore be desirable to reduce the weight of a pin joint assembly without compromising its load carrying capability.

SUMMARY OF THE INVENTION

A pin joint assembly for an aircraft landing gear comprising: an elongate joint pin; at least one first lug through which the joint pin passes; and at least one second lug through which the joint pin passes; wherein the joint pin includes first and second retaining elements located at opposite ends of the joint pin and arranged to maintain the location of the joint pin relative to the first and second lugs, wherein at least a portion of the pin joint is elastically deformable.

Thus, any deflection of the first or second lugs may cause the portion of the pin joint to elastically deform such that the force exerted onto the pin joint is significantly lower than would be exerted if the portion was non-compliant. As a consequence of the reduced load transmitted from the lugs to elements of the pin joint assembly, these elements can be significantly reduced in size and weight in comparison with a pin joint assembly of the same load carrying capability with non-compliant elements of the pin joint assembly, or alternatively these elements can be kept the same size with an increased load carrying capability.

One or more of the first and second retaining elements may be secured to the pin joint assembly by one or more retaining bolts extending through the joint pin in a direction parallel to the longitudinal axis of the joint pin.

One or more of the first and second retaining elements may be elastically deformable. Alternatively or in addition, one or more of the retaining bolts may be elastically deformable, preferably in a direction parallel to the longitudinal axis of the joint pin, so that they may comply with deflections of the lugs.

Preferably, at least one of the first and second retaining elements comprises an end cap secured to the joint pin. In which case, either or both end caps may be secured to the one or more retaining bolts by means of one or more retaining nuts threaded to portions of respective retaining bolts passing through the or each respective end cap. Alternatively, retaining bolts may comprise a head at one end and a thread at the other, such that a single end cap is used, secured to the bolt by a retaining nut threaded onto the end of the retaining bolt. In which case the head and/or end cap may be flexible.

One or more of the retaining elements, retaining bolts or joint pin may comprise steel, aluminium, or titanium.

In order to introduce compliance, one or more of the retaining elements may have an axial thickness of less than 5 millimeters.

According to a second aspect of the invention, there is provided an aircraft landing gear comprising a pin joint assembly as described with reference to aspects of the present invention.

BRIEF DESCRIPTION OF THE DRAWINGS

Embodiments of the present invention will now be described in more detail by way of non-limiting examples only, with reference to the accompanying figures, of which.

DETAILED DESCRIPTION OF EMBODIMENTS OF THE PRESENT INVENTION

Figure 1:
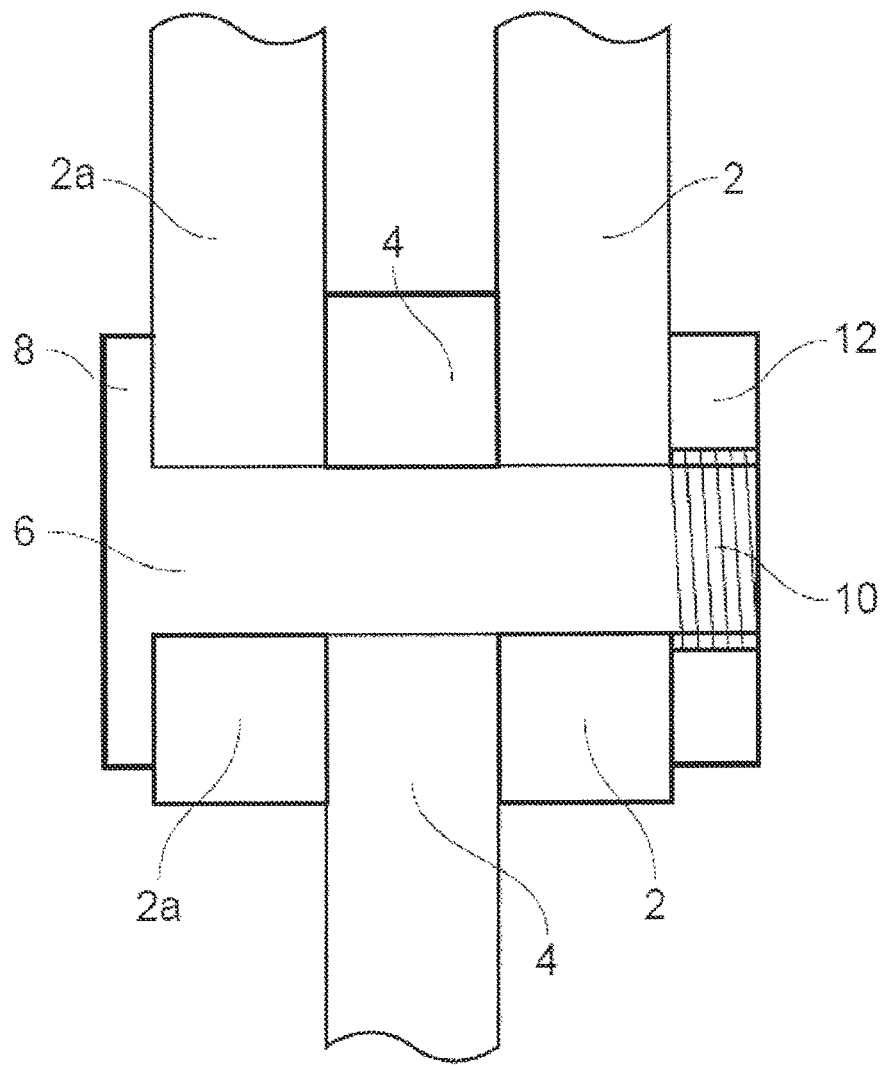
FIG. 1 schematically illustrates a cross-section of a pin joint assembly according to the prior art.

A pin joint assembly according to the prior art is schematically illustrated in cross-section in FIG. 1. The pin joint assembly includes a pair of first lugs 2, 2a and a second lug 4 interposed between the first lugs, and a joint pin 6 passing through the first and second lugs and about which the lugs can rotate. The joint pin 6 has an integral head 8 located at one end of the pin preventing the pin from passing all the way through the first and second lugs, and has a threaded portion 10 provided at the opposite end to which a retaining nut 12 is secured, thus completing the pin joint assembly. Any deflections in the first and second lugs 2, 2a, 4 caused by radial or axial loading of the pin joint, cause the lugs to contact either the pin head 8 or retaining nut 12 and consequently load the stiff joint pin (bolt) 6 potentially to the point where the load is so high that the pin or the retaining nut 12 will fail. To prevent such failure the nut 12, and also pin head 8, must be oversized so as to be able to accommodate the additional lug deflection loadings over and above the normal operational loadings of the pin joint. This adds weight and cost to the pin joint assembly.

Figure 2:
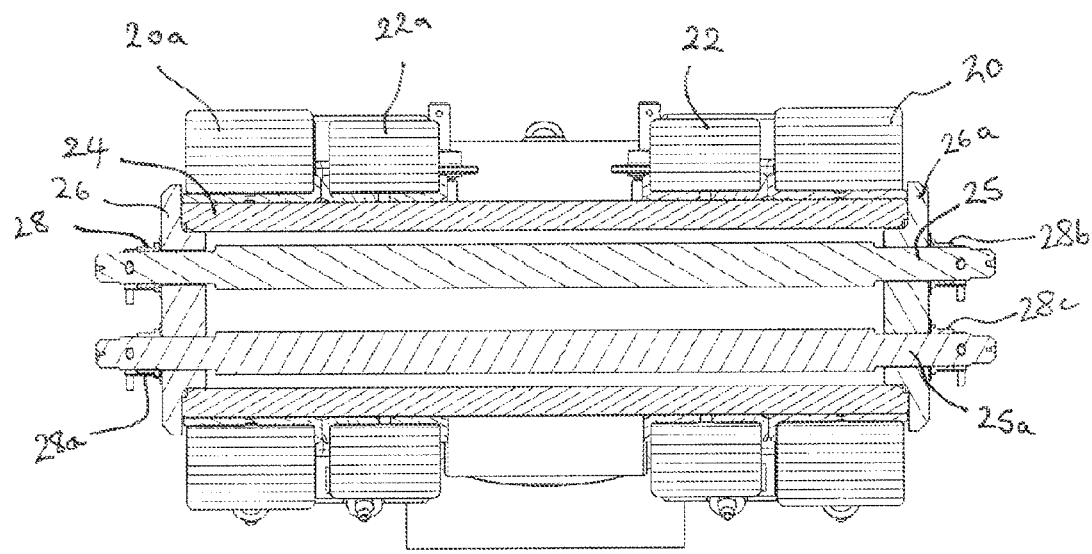
FIG. 2 schematically illustrates a cross-section of an alternative pin joint assembly according to prior art.

An alternative pin joint also known the art is schematically illustrated in plan view cross-section in FIG. 2. As with the pin joint assembly shown in FIG. 1, first and second lugs 20, 20a & 22, 22a are provided through which a joint pin 24 extends. One or more retaining bolts 25, 25a extend through a bore or hollow section in the joint pin 24 in a direction parallel to the longitudinal axis of the joint pin 24 and may be held in place at either end by two retaining elements 26, 26a (also known as end caps) through which a portion of each of the one or more retaining bolts 25, 25a extends. The portions of the retaining bolts 25, 25a that extend through the retaining elements 26, 26a are threaded and respective retaining nuts 28, 28a, 28b, 28c are fastened to the threaded portions, thereby securing the retaining elements 26, 26a in place and maintaining the physical arrangement of the pin joint assembly. As with the assembly shown in FIG. 1, any deflections of the lugs 20, 20a, 22, 22a caused by radial loading of the pin joint 24, cause the lugs 20, 20a, 22, 22a to contact one or both of the retaining elements 26, 26a. Because the retaining elements 26, 26a are substantially non-compliant, axial force applied by the lugs to any portion of the interior surface of the retaining elements 26, 26a is transferred into the retaining nuts 28, 28a, 28b, 28c and retaining bolts 25, 25a which secure the joint pin 24 in place. Consequently, the retaining elements 26, 26a, retaining nuts 28, 28a, 28b, 28c and retaining bolts 25, 25a must again be oversized so as to accommodate lug deflection associated with abnormal operating loadings of the pin joint 24.

Figure 3:
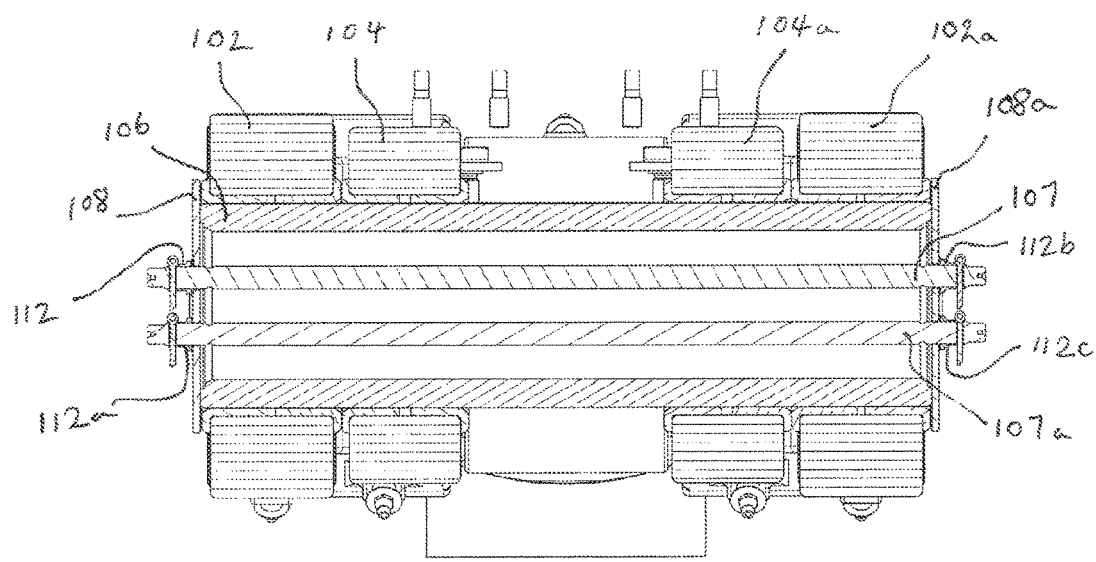
FIG. 3 schematically illustrates in cross-section a pin joint assembly according to an embodiment of the present invention.

A pin joint assembly according to an embodiment of the present invention is schematically illustrated in plan view cross-section in FIG. 3. As with the previously illustrated pin joint assembly of FIG. 2, first and second lugs 102, 102a, 104, 104a are provided through which a joint pin 106 extends and one or more retaining bolts 107, 107a extend laterally through the joint pin 106 in a direction parallel to the longitudinal axis of the joint pin 106. However, the retaining elements 26, 26a illustrated in FIG. 2 are replaced with compliant or flexible retaining elements 108, 108a. The portions of the retaining bolts 107, 107a that extend through the compliant retaining elements 108, 108a may be threaded at either end and respective retaining nuts 112, 112a, 112b, 112c fastened to the threaded portions or the retaining bolts 107, 107a. Alternatively, each of the one or more retaining bolts 107, 107a may have a head at one end and a thread at the other, in which case a single retaining nut is required for each retaining bolt 107, 107a. As a further alternative, instead of using retaining bolts, each end of the joint pin itself may extend through a retaining element 108, 108a.

In use, if the pin joint assembly in FIG. 3 is loaded so as to induce a deflection of the first and/or second lugs 102, 102a, 104, 104a, this deflection causes the compliant retaining elements 108, 108a to elastically deform. Then, once the load is removed from the stay and the lugs 102, 102a, 104, 104a return to their original position, the retaining elements 108, 108a also return to their original position. Although the compression of each of the compliant retaining elements 108, 108a will still exert a force on its corresponding retaining nut(s) 112, 112a, 112b, 112c and retaining bolt 107, 107a, this force is significantly lower than would be exerted by the prior art retaining elements 26, 26a.

The load path in the pin joint assembly is indeterminate. Where indeterminate load paths are concerned, the stiffer an element is, the more load carrying capability it has. Thus, introduction of flex into the retaining elements means that, as the lugs experience deflection, less load is reacted through the retaining elements 108, 108a, retaining nuts 112, 112a, 112b, 112c and retaining bolts 107, 107a, such load instead being transferred and reacted by the joint pin. As a consequence of the reduced load transmitted from the lugs to the retaining bolts 107, 107a and/or retaining nuts 112, 112a, 112b, 112c, these elements can be significantly reduced in size and weight in comparison with a pin joint assembly of the same load carrying capability of the prior art. Furthermore, in order to make the retaining elements 108, 108a more compliant and flexible, they can be made thinner, thus further reducing the size and weight in comparison with the non-compliant retaining elements 26, 26a used in the prior art pin joint shown in FIG. 2. Such thin retaining elements or end caps can be made from standard sheet metal, further reducing costs compared to thick end caps or heads, which need to be machined. Moreover, since retaining elements 108, 108a no longer need to withstand the forces applied by deflecting lugs, they need not be as strong.

The compliance of retaining elements may be reduced by reducing their thickness. For example, prior art end caps in stay pin joints which traditionally having a thickness of between 15 to 20 mm can be reduced in thickness to around 3 mm. Alternatively or in addition, retaining elements could be manufactured from less stiff materials, since the retaining elements do not need to resist as much load as traditional retaining elements. For example, retaining elements could be made from materials such as aluminium or titanium.

In embodiments described above, the retaining elements or end caps are designed to comply with deflection of the lugs 102, 102a, 104, 104a. However, in other embodiments other elements of the pin joint assembly could be engineered to elastically deform. For example, retaining bolts 107, 107a could be replaced with one or more retaining bolts which are axially elastically deformable so that as the lugs deflect, applying pressure to the retaining bolts or retaining elements, compliance of the retaining bolts absorbs forces associated with the deflections.

By reducing the stiffness of the pin joint assembly of embodiments of the present invention by the introduction of compliance in retaining elements to absorb local deflections, the resulting pin joint assembly can be significantly smaller and lighter than the corresponding prior art pin joint assemblies. For example, for a typical dual stay aircraft landing gear with six joints approximately 15 kg of weight reduction can be achieved using pin joint assemblies according to the present invention.

The invention claimed is:

1. A pin joint assembly for an aircraft landing gear comprising:
   an elongate joint pin;
   at least one first lug through which the joint pin passes, the first lug having a first lug portion bearing on a first part of the joint pin and a second lug portion bearing on a second part of the joint pin, the second part being spaced from the first part;
   at least one second lug through which the joint pin passes, the second lug bearing on a third part of the joint pin independently of the first lug, the third part being between and separate from the first part and the second part; and first and second retaining elements located at opposite ends of the joint pin and arranged to maintain the location of the joint pin relative to the first and second lugs;

wherein at least a portion of the pin joint assembly is elastically deformable.

2. The pin joint assembly according to claim 1, wherein one or more of the first and second retaining elements is elastically deformable.

3. The pin joint assembly according to claim 2, at least one of the first and second retaining elements comprises an elastically deformable flat plate.

4. The pin joint assembly according to claim 3, wherein the elastically deformable flat plate has a thickness along a longitudinal axis of the joint pin of about 3 millimeters.

5. The pin joint assembly according to claim 1, wherein the first and second retaining elements are secured to the pin joint assembly by one or more retaining bolts extending through the joint pin in a direction parallel to a longitudinal axis of the joint pin.

6. The pin joint assembly according to claim 5, wherein the one or more retaining bolts are elastically deformable in a direction parallel to their longitudinal axis.

7. The pin joint assembly according to claim 5, wherein at least one of the first and second retaining elements comprises an end cap secured to one of the one or more retaining bolts.

8. The pin joint assembly according to claim 7, wherein one or more of the end caps are secured to the joint pin by a retaining nut threaded to a portion of the one or more retaining bolts passing through the or each respective end cap.

9. The pin joint assembly according to claim 1, wherein one or more of the retaining elements comprise steel, aluminium or titanium.

10. The pin joint assembly according to claim 1, wherein the elongate joint pin comprises fibre reinforced composite.

11. The pin joint assembly according to claim 1, wherein one or more of the retaining elements has an axial thickness of less than 5 millimetres.

12. An aircraft landing gear comprising a pin joint assembly according claim 1.

* * * * *

UNITED STATES PATENT AND TRADEMARK OFFICE
CERTIFICATE OF CORRECTION

PATENT NO. : 9,863,455 B2  
APPLICATION NO. : 14/761142  
DATED : January 9, 2018  
INVENTOR(S) : Chris Green Page 1 of 1

It is certified that error appears in the above-identified patent and that said Letters Patent is hereby corrected as shown below:

On the Title Page

Item (22) PCT Filed:, delete date "Jan. 13, 2014" and insert date --January 3, 2014--.

Signed and Sealed this  
Tenth Day of April, 2018

Andrei Iancu  
*Director of the United States Patent and Trademark Office*